United States Patent
Moon et al.

(10) Patent No.: US 9,840,755 B2
(45) Date of Patent: Dec. 12, 2017

(54) REFINING DEVICE AND REFINING METHOD FOR TITANIUM SCRAPS AND SPONGE TITANIUM USING DEOXIDISING GAS

(71) Applicant: KOREA INSTITUTE OF INDUSTRIAL TECHNOLOGY, Cheonan-si (KR)

(72) Inventors: Byung Moon Moon, Seoul (KR); Gang June Kim, Bucheon-si (KR); Jae Yoon Lee, Seoul (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 222 days.

(21) Appl. No.: 14/777,835

(22) PCT Filed: Jun. 12, 2013

(86) PCT No.: PCT/KR2013/005178
§ 371 (c)(1),
(2) Date: Sep. 30, 2015

(87) PCT Pub. No.: WO2014/148687
PCT Pub. Date: Sep. 25, 2014

(65) Prior Publication Data
US 2016/0177418 A1 Jun. 23, 2016

(30) Foreign Application Priority Data

Mar. 18, 2013 (KR) .................. 10-2013-0028752
Mar. 18, 2013 (KR) .................. 10-2013-0028753

(51) Int. Cl.
*C22B 34/12* (2006.01)
*C22B 9/05* (2006.01)
(Continued)

(52) U.S. Cl.
CPC .......... *C22B 34/1268* (2013.01); *C22B 9/003* (2013.01); *C22B 9/04* (2013.01);
(Continued)

(58) Field of Classification Search
CPC . C22B 34/1295; C22B 34/1268; C22B 9/003; C22B 9/04; C22B 9/05;
(Continued)

(56) References Cited

U.S. PATENT DOCUMENTS 4,794,979 A * 1/1989 Gassner ............. B22D 11/0631
164/469
2009/0256292 A1 * 10/2009 Jackson ............... B22D 11/001
266/45

FOREIGN PATENT DOCUMENTS

CN 102517464 A * 6/2012
JP 07252550 10/1995
(Continued)

OTHER PUBLICATIONS

Y. Waseda et al. (eds). "Hydrogen Plasma Arc Melting." Purification Process and Characterization of Ultra High Purity Metals. Springer-Verlag Berlin Heidelberg. 2002. pp. 181-202.*
(Continued)

*Primary Examiner* — George Wyszomierski
*Assistant Examiner* — Tima M McGuthry Banks
(74) *Attorney, Agent, or Firm* — Cantor Colburn LLP

(57) ABSTRACT

Provided are a method and apparatus for refining titanium scraps and sponge titanium, which can remove oxygen from a melt by supplying a deoxidizing gas to the surface of the melt in order to refine titanium scraps and sponge titanium. The method for refining titanium scraps and sponge titanium comprises supplying hydrogen ions and electrons in plasma to a titanium melt to remove oxygen from the titanium melt surface having an oxide layer formed thereon. In addition,
(Continued)

the apparatus comprises: a vacuum chamber; a crucible located in the vacuum chamber and configured to perform melting by the magnetic field of an induction coil in a state in which a melt and the inner wall of the crucible; a calcium gas supply means configured to supply calcium gas from the bottom of the crucible to the space between the inner wall of the crucible and the melt.

13 Claims, 10 Drawing Sheets

(51) Int. Cl.
  *C22B 9/22*  (2006.01)
  *C22B 9/04*  (2006.01)
  *C22B 9/00*  (2006.01)
  *F27D 7/02*  (2006.01)
  *F27D 7/06*  (2006.01)
  *F27D 11/06*  (2006.01)
  *F27B 14/06*  (2006.01)
  *H05B 6/26*  (2006.01)
  *F27D 99/00*  (2010.01)

(52) U.S. Cl.
  CPC ............... *C22B 9/05* (2013.01); *C22B 9/226* (2013.01); *C22B 34/1218* (2013.01); *C22B 34/1295* (2013.01); *F27B 14/061* (2013.01); *F27D 7/02* (2013.01); *F27D 7/06* (2013.01); *F27D 11/06* (2013.01); *F27D 99/0006* (2013.01); *H05B 6/26* (2013.01); *F27D 2007/063* (2013.01); *F27D 2007/066* (2013.01); *Y02P 10/23* (2015.11); *Y02P 10/253* (2015.11)

(58) Field of Classification Search
  CPC . F27B 14/061; F27D 7/02; F27D 7/06; F27D 11/06
  See application file for complete search history.

(56) References Cited

FOREIGN PATENT DOCUMENTS

| | | |
|---|---|---|
| JP | 07278691 | 10/1995 |
| JP | 2001279340 | 10/2001 |
| JP | 2006063359 | 3/2006 |

OTHER PUBLICATIONS

Machine translation of CN 102517464 A published Jun. 2012.*
International Search Report—PCT/KR2013/005178 dated Dec. 11, 2013.

* cited by examiner

REFINING DEVICE AND REFINING METHOD FOR TITANIUM SCRAPS AND SPONGE TITANIUM USING DEOXIDISING GAS

TECHNICAL FIELD

The present invention relates, in general, to an apparatus and method for refining titanium scraps and sponge titanium, and more particularly, to an apparatus and method for refining titanium scraps and sponge titanium, which can produce a high-purity titanium ingot.

BACKGROUND ART

The demand for titanium is continuously increasing not only in the aircraft market, but also in general industrial products and livelihood products, and it appears that the global demand for titanium will exceed the production of titanium.

Thus, it appears that the demand for titanium in the global market is continuously increasing, but the foundation of the titanium recycling market is weak.

In recent years, requirements for titanium recycling have been proposed, and technology for refining metal scraps or sponge for recycling purposes has received attention.

However, in the prior art, there were problems in that processes for smelting, refining and melting titanium require advanced technology and much energy due to the high melting point and high chemical activity of titanium and in that the difficult processability and high production cost of titanium pose an obstacle to the general use of titanium.

Meanwhile, current methods for melting titanium scraps include a vacuum arc remelting (VAR) method, an electron beam melting (EBM) method, a plasma arc melting (PAM) method, etc., which are used to melt titanium sponge extracted from titanium ore. When such methods are used to recycle titanium scraps, there is a problem in that the application of such methods to the titanium recycling market is difficult, because equipment corresponding to fixed costs is expensive.

In addition, good-quality titanium scraps can be produced into ingots by remelting. However, it is difficult to obtain high-purity titanium from titanium scraps having a high content of impurities (oxygen, nitrogen, etc.), which are generated mainly in the processing of sheets, wire rods or the like, because a separate process for refining such titanium scraps does not exist.

DISCLOSURE

Technical Problem

The present invention has been made in order to solve the above-described problems, and it is an object of the present invention to provide a method for refining titanium scraps and sponge titanium, which can remove oxygen from a melt by supplying plasma gas to the melt in order to efficiently refine titanium scraps.

Another object of the present invention is to provide an apparatus and method for refining titanium scraps and sponge titanium, which can efficiently remove oxygen from a melt by supplying calcium gas together with inert gas around the melt to form a curtain wall flow for the purpose of efficiently refining titanium scraps.

Technical Solution

In order to accomplish the above objects, in accordance with an embodiment of the present invention, there is provided a method for refining titanium scraps and sponge titanium, the method comprising a step of removing oxygen from a titanium melt by supplying plasma gas from the top of a crucible to the surface of the melt.

In the method, the plasma gas may comprise argon and hydrogen.

Argon and hydrogen from the plasma gas may be supplied at a volume ratio ranging from 1:0.03 to 1:0.5.

The step of removing oxygen may comprise the steps of:
diffusing the plasma gas to the surface of the melt;
adsorbing the diffused plasma gas to the surface of the melt; and
allowing hydrogen ions and electrons in the plasma gas to react with oxygen atoms of the melt on the surface of the melt.

In accordance with another embodiment of the present invention, there is provided a method for refining titanium scraps and sponge titanium, the method comprising a step of removing oxygen from a titanium melt by supplying plasma gas from the top of a crucible to the surface of the melt and adsorbing an atmospheric oxygen molecule to the surface of the melt to form a titanium oxide layer.

In this method, the step of removing oxygen may comprise the steps of:
diffusing the plasma gas to the surface of the melt;
allowing hydrogen ions and electrons, released from the plasma gas, to react with oxygen atoms of the melt on an oxide layer; and
allowing an excess of hydrogen atoms, released from the plasma gas, to combine into a hydrogen molecule which is consumed.

In accordance with still another embodiment of the present invention, there is provided a method for refining titanium scraps and sponge titanium, the method comprising the steps of:
performing melting in a crucible by the magnetic field of an induction coil in a state in which a melt and the inner wall of the crucible do not come in contact with each other; and
supplying calcium gas from the bottom of the crucible to the space between the inner wall of the crucible and the melt to remove oxygen from the melt.

In this method, the calcium gas may form a curtain wall flow surrounding the melt.

In accordance with still another embodiment of the present invention, there is provided a method for refining titanium scraps and sponge titanium, the method comprising the steps of:
performing melting in a crucible by the magnetic field of an induction coil in a state in which a melt and the inner wall of the crucible do not come in contact with each other;
supplying plasma gas from the top of the crucible to the surface of the melt to remove oxygen from the melt; and
supplying calcium gas from the bottom of the crucible to the space between the inner wall of the crucible and the melt to remove oxygen from the melt.

This method may further comprise the steps of:
bringing unreacted calcium gas of the calcium gas into contact with plasma to produce calcium ions; and
removing oxygen from the melt by the produced calcium ions.

In accordance with still another embodiment of the present invention, there is provided an apparatus for refining titanium scraps and sponge titanium, the apparatus comprising:
a vacuum chamber;
a crucible located in the vacuum chamber and configured to perform melting by the magnetic field of an induction coil in a state in which a melt and the inner wall of the crucible doe not come in contact with each other;

a calcium gas supply means configured to supply calcium gas from the bottom of the crucible to the space between the inner wall of the crucible and the melt.

The apparatus may further comprise a collection plate located above the crucible and configured to collect impurity gases which are generated during melting.

The calcium gas may be injected around the melt to form a curtain wall flow surrounding the melt.

The calcium gas supply means may comprise:

a calcium gas production unit configured to vaporize solid-state calcium by heat to produce calcium gas; and a plurality of injection units configured to inject the calcium gas, supplied from the calcium gas production unit, from the bottom of the crucible to the top of the crucible.

The apparatus mat further comprise a mixing chamber connected to the calcium gas production unit and configured to mix an inert gas, supplied from the outside, with the calcium gas supplied from the calcium gas, and to supply the mixed gases to the injection units.

The mixing chamber may further comprise a heating means configured to heat the inert gas.

Advantageous Effects

According to the present invention, oxygen, an impurity, can be efficiently removed from a titanium melt by supplying hydrogen ions and electrons in plasma to the melt for the purpose of refining titanium scraps and sponge titanium.

In addition, according to the present invention, oxygen can be removed from a titanium melt by injecting calcium gas around the melt during refining of titanium scraps and sponge titanium, and thus a high-purity titanium ingot can be produced.

DESCRIPTION OF REFERENCE NUMERALS USED IN THE DRAWINGS

10: plasma torch;
11: plasma;
20: vacuum chamber;
21: inlet;
22: outlet;
30: crucible;
31: induction coil;
32: melt;
32': melt having formed thereon an oxide layer;
35: inner wall;
41 and 42: injection units;
50: ingot;
60: collection plate;
100: calcium gas production unit;
200: mixing chamber.

MODE FOR INVENTION

Unless otherwise defined, all technical terms used herein have the same meaning as commonly understood by one skilled in the art to which the present invention pertains. In addition, preferred methods or samples are described herein, but those similar or equivalent thereto also fall within the scope of the present invention.

Throughout this specification, unless the context requires otherwise, the words "comprise," "comprises," and "comprising" will be understood to imply the inclusion of a stated step or element or group of steps or elements but not the exclusion of any other step or element or group of steps or elements.

Hereinafter, exemplary embodiments of the present invention will be described in detail with reference to the accompanying drawings.

Figure 1:
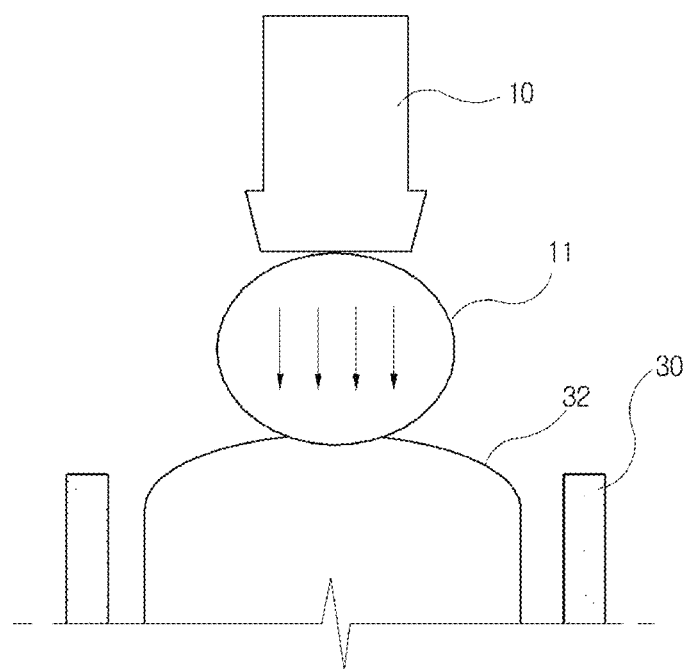
FIG. 1 is a schematic view illustrating the principle of plasma refining which is applied to a method for refining titanium scraps and sponge titanium according to an embodiment of the present invention.

Referring to FIG. 1, plasma gas is supplied from the top of a crucible to the surface of a titanium melt to remove oxygen from the melt. In addition, when the plasma gas is supplied, impurities having a vapor pressure lower than that of titanium are evaporated. The melt may be one obtained by the steps of: packing titanium scraps; washing the titanium scraps; and melting the titanium scraps.

Plasma 11 is released from a plasma torch 10, and impurities are evaporated from the surface of a titanium melt 32.

Gases released from the plasma 11 may include pilot gas and shield gas. The pilot gas acts to stabilize the plasma flame, and the shield gas is supplied after stabilization of the plasma flame.

The pilot gas may comprise argon, and the shield gas may comprise argon and hydrogen.

Argon and hydrogen in the shield gas may be supplied at a volume ratio ranging from 1:0.03 to 1:0.5.

Figure 2A:
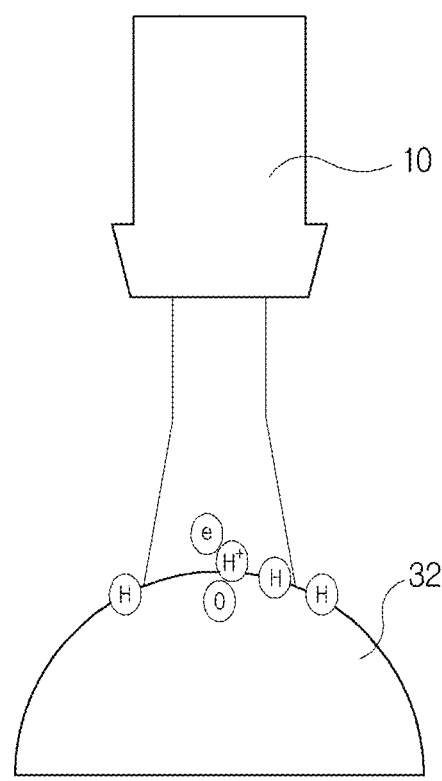
FIGS. 2a and 2b are state diagrams illustrating an oxygen removal mechanism employing hydrogen ions, which is applied to a method for refining titanium scraps and sponge titanium according to an embodiment of the present invention.

Referring to FIG. 2a, the step of removing oxygen from the titanium melt may comprise the steps of:

diffusing plasma gas to the surface of the melt 32;

adsorbing the diffused plasma gas to the surface of the melt 32; and allowing hydrogen ions and electrons, contained in the plasma gas, to react with oxygen atoms of the melt 32 on the surface of the melt 32. The hydrogen ions and electrons contained in the plasma gas react with the oxygen atoms to form water vapor which is then discharged. Thus, oxygen is removed from the titanium melt 32.

Figure 2B:
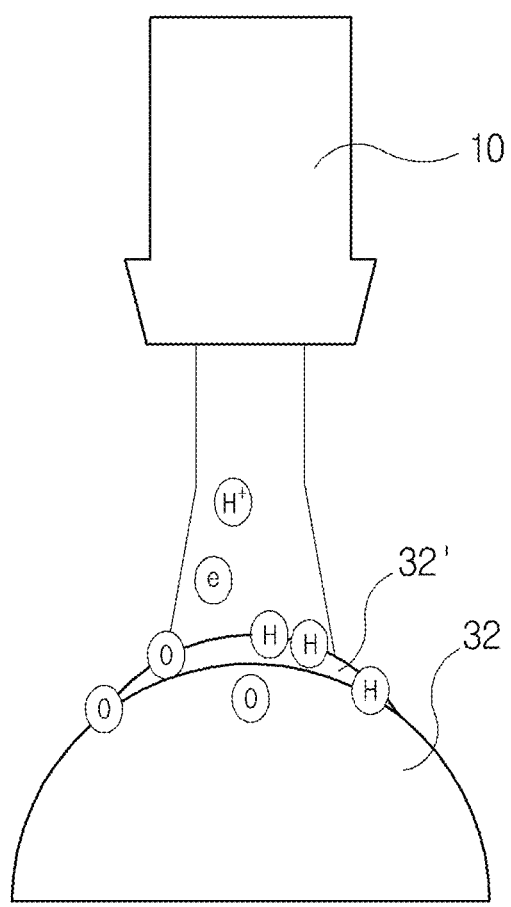

Referring to FIG. 2b, according to the present invention, an atmospheric oxygen molecule is adsorbed to the surface of the titanium melt 32 in the crucible to form a titanium oxide layer 32'. In this case, the step of removing oxygen from the titanium melt may comprise the steps of:

diffusing plasma gas to the surface of the melt 32;

allowing hydrogen ions and electrons, released from the plasma gas, to react with oxygen atoms of the melt on the oxide layer 32'; and allowing an excess of hydrogen atoms, released from the plasma gas, to combine into a hydrogen molecule which is consumed.

The oxygen removal as described above can be explained as follows.

Figure 3:
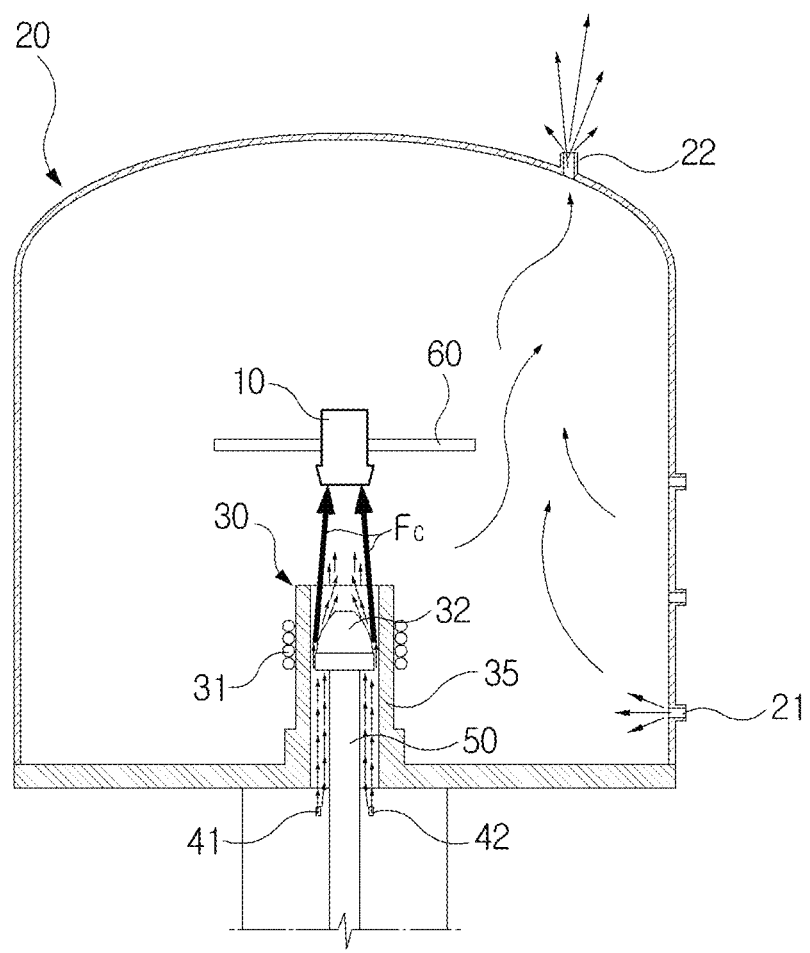
FIG. 3 is a state diagram showing the state of gas flows in an apparatus for refining titanium scraps and sponge titanium according to an example of the present invention.

Referring to FIG. 3, a method for refining titanium scraps and sponge titanium according to an embodiment of the present invention may comprise the steps of: performing melting in a crucible by the magnetic field of an induction coil in a state in which a melt and the inner wall of the crucible do not come in contact with each other; and removing oxygen from the melt by supplying calcium gas from the bottom of the crucible to the space between the inner wall of the crucible and the melt.

When a gas mixture (mixture of inert gas and calcium gas) is injected through injection units 41 and 42 under the crucible 30, the gas mixture is then injected into the gap

TABLE 1

| Ti(g) + O(g) = TiO(g) | | Ti(g) + O2(g) = TiO2(g) | | 2H + (g) + O(g) + 2e − (g) = H2O(g) | | 4H + (g) + O2(g) + 4e − (g) = 2H2O(g) | |
|---|---|---|---|---|---|---|---|
| Temperature (° C.) | ΔG (kcal) | Temperature (° C.) | ΔG (kcal) | Temperature (° C.) | ΔG (kcal) | Temperature (° C.) | ΔG (kcal) |
| 0 | −152.7277 | 0 | −178.0306 | 0 | −836.538 | 0 | −1561.609 |
| 200 | −147.4496 | 200 | −171.9621 | 200 | −824.736 | 200 | −1543.734 |
| 400 | −141.9746 | 400 | −165.8035 | 400 | −811.482 | 400 | −1523.205 |
| 600 | −136.4084 | 600 | −159.6246 | 600 | −797.26 | 600 | −1500.879 |
| 800 | −130.7876 | 800 | −153.4398 | 800 | −782.326 | 800 | −1477.214 |
| 1000 | −125.1274 | 1000 | −147.2504 | 1000 | −766.839 | 1000 | −1452.502 |
| 1200 | −119.4342 | 1200 | −141.0543 | 1200 | −750.904 | 1200 | −1426.941 |
| 1400 | −113.7104 | 1400 | −134.8475 | 1400 | −734.599 | 1400 | −1400.671 |
| 1600 | −107.9562 | 1600 | −128.6254 | 1600 | −717.979 | 1600 | −1373.799 |
| 1800 | −102.1709 | 1800 | −122.3834 | 1800 | −701.086 | 1800 | −1346.402 |
| 2000 | −96.35358 | 2000 | −116.1171 | 2000 | −683.955 | 2000 | −1318.544 |
| 2200 | −90.50308 | 2200 | −109.8224 | 2200 | −666.61 | 2200 | −1290.275 |
| 2400 | −84.61842 | 2400 | −103.4958 | 2400 | −649.075 | 2400 | −1261.635 |
| 2600 | −78.69888 | 2600 | −97.13418 | 2600 | −631.366 | 2600 | −1232.658 |
| 2800 | −72.74407 | 2800 | −90.73501 | 2800 | −613.5 | 2800 | −1203.371 |
| 3000 | −66.7539 | 3000 | −84.29626 | 3000 | −595.487 | 3000 | −1173.799 |
| 3200 | −60.72852 | 3200 | −77.8163 | 3200 | −577.34 | 3200 | −1143.962 |
| 3400 | −54.6682 | 3400 | −71.29389 | 3400 | −559.068 | 3400 | −1113.878 |
| 3600 | −48.57333 | 3600 | −64.72811 | 3600 | −540.679 | 3600 | −1083.564 |
| 3800 | −42.44436 | 3800 | −58.11835 | 3800 | −522.181 | 3800 | −1053.034 |
| 4000 | −36.2818 | 4000 | −51.46424 | 4000 | −503.581 | 4000 | −1022.3 |
| 4200 | −30.08619 | 4200 | 44.76564 | 4200 | 484.883 | 4200 | −991.374 |
| 4400 | −23.85807 | 4400 | −38.0226 | 4400 | 466.094 | 4400 | −960.267 |
| 4600 | −17.59798 | 4600 | −31.23539 | 4600 | 447.218 | 4600 | −928.987 |
| 4800 | −11.30651 | 4800 | −24.40449 | 4800 | 428.259 | 4800 | −897.542 |
| 5000 | −4.984267 | 5000 | −17.5306 | 5000 | 409.221 | 5000 | −865.941 |
| 5200 | 1.3681288 | 5200 | −10.61455 | 5200 | −390.107 | 5200 | −834.19 |
| 5400 | 7.750085 | 5400 | −3.657301 | 5400 | −370.922 | 5400 | −802.296 |
| 5600 | 14.161043 | 5600 | 3.3400688 | 5600 | −351.667 | 5600 | −770.265 |
| 5800 | 20.600485 | 5800 | 10.376399 | 5800 | −332.344 | 5800 | −738.101 |
| 6000 | 27.067945 | 6000 | 17.450449 | 6000 | −312.958 | 6000 | −705.809 |

Table 1 above shows the standard free energy values of reactions between titanium and oxygen atoms or oxygen molecules and between hydrogen and oxygen atoms or oxygen molecules as a function of temperature.

The change in Gibbs free energy (ΔG) is ΔG=ΔH-TΔS, indicating that it is proportional to the change in the total entropy of the system and its surroundings. Because any spontaneous change involves an increase in the total entropy, it causes a decrease in Gibbs free energy in the system. Thus, if ΔG is smaller than 0, a positive reaction is spontaneous.

Figure 6A:
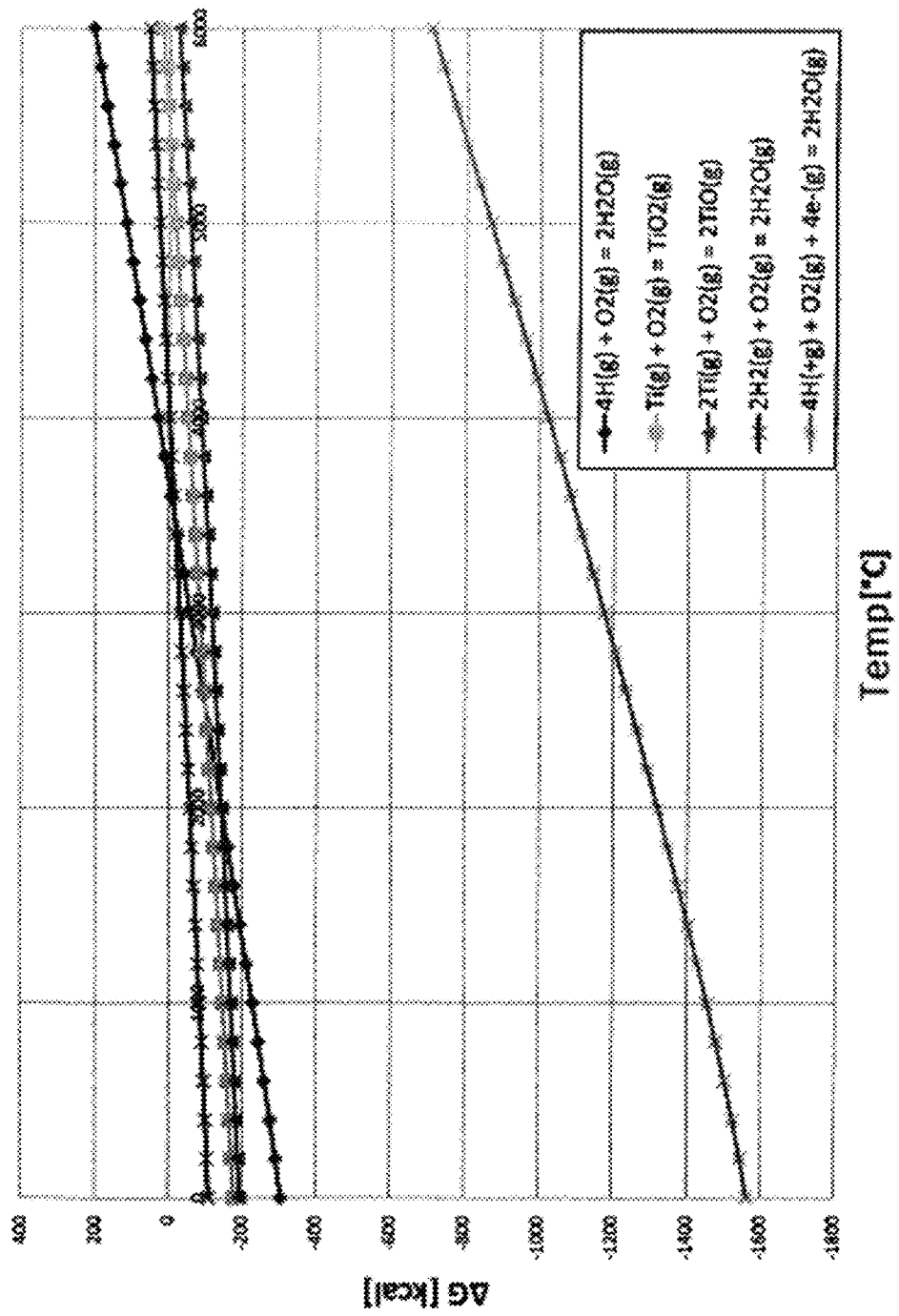
FIGS. 6a and 6b show the standard free energy values of reactions between titanium and oxygen atoms or oxygen molecules and between hydrogen and oxygen atoms or oxygen molecules as a function of temperature.
Figure 6B:
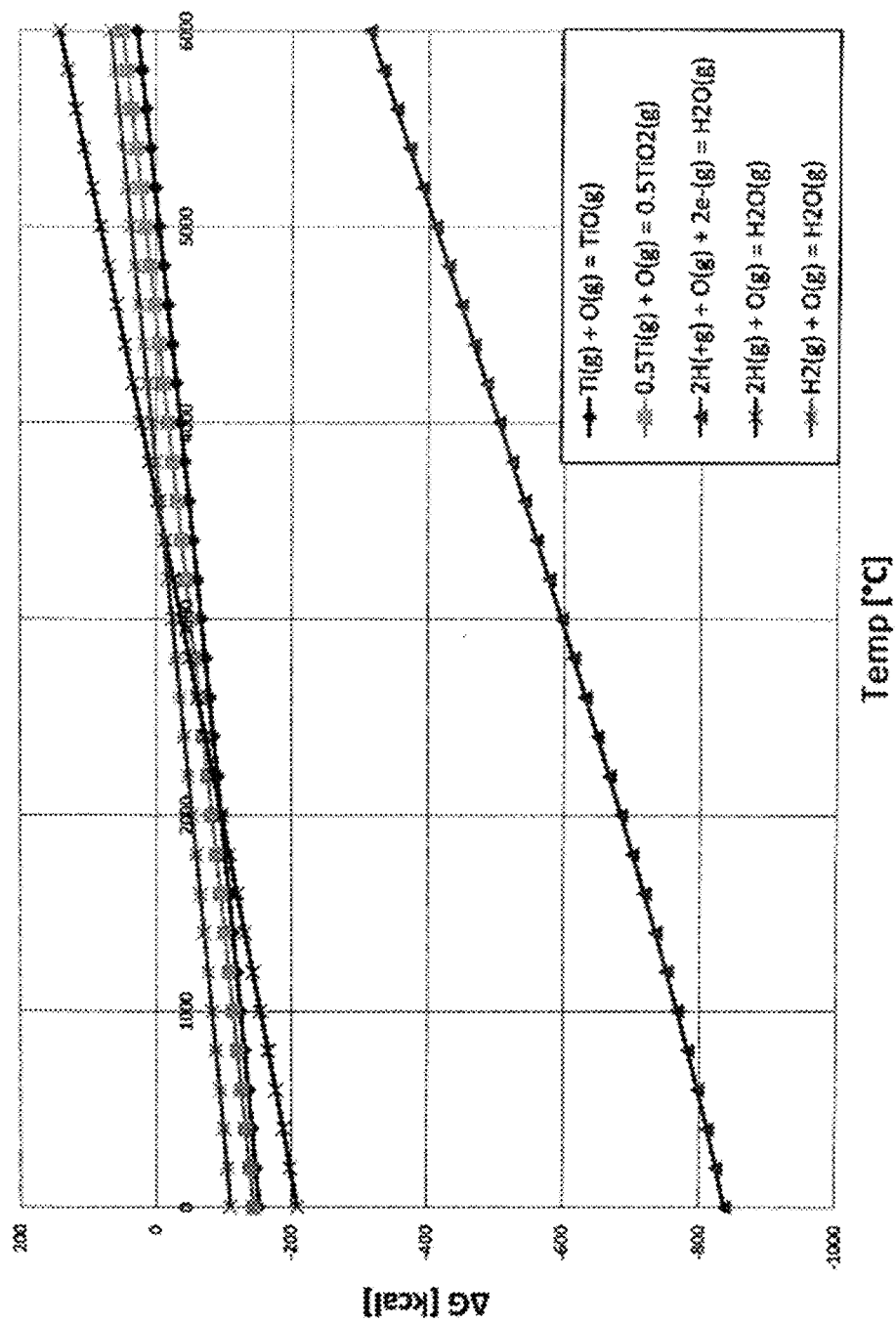

Referring to Table 1 above and FIGS. 6a and 6b, the change in Gibbs free energy between reactions can be seen. Specifically, it can be seen that, at 1600° C. corresponding to the melting point of titanium, ΔG is −107.96 kcal for the reaction "Ti(g)+O(g)=TiO(g)" and −128.63 kcal for the reaction "Ti(g)+O$_2$(g)=TiO$_2$(g)", but is −717.9 kcal for the reaction "2H$^+$(g)+O(g)+2e$^-$=H$_2$O(g)". Thus, it can be seen that the reaction between hydrogen and oxygen is spontaneous, because the ΔG of this reaction is lower than that of the reaction between titanium and oxygen.

between the ingot 50 and the inner wall 35, passes through the space between the melt 32 and the inner wall 35, and is transferred to the bottom side of a collection plate 60. Thus, as shown in FIG. 3, the gas injected vertically from the injection units 41 and 42 forms a curtain wall flow (F$_c$) between the top of the crucible 30 and the collection plate 60. In other words, the gas flow that moves up along the outside of the melt 32 forms a curtain wall flow (Fc) corresponding to the outside of the melt 32.

The curtain wall flow (Fc) formed as described above acts to remove oxygen generated during melting in the crucible 30, and also acts to prevent impurity gas generated during melting from being diffused into a vacuum chamber 20.

In addition, the curtain wall flow (Fc) functions to induce impurity gas, which rises from the crucible 30, to be concentrated on the bottom of the collection plate 60. Specifically, the gas mixture injected from the bottom of the crucible 30 is injected directly to the bottom side of the collection plate 60 through the gap between the melt and the crucible to form the curtain wall flow (Fc). The formed curtain wall flow (Fc) functions to guide impurity gas, which is generated during metal melting and rises from the crucible 30, to the collection plate 60 while maintaining the impurity gas in the curtain wall flow (Fc) so as to prevent the impurity gas from being diffused into the vacuum chamber 20, and it also functions to remove oxygen from the melt 32.

A method for refining titanium scraps and sponge titanium according to another embodiment of the present invention may comprise the steps of: performing melting in a crucible by the magnetic field of an induction coil in a state in which a melt and the inner wall of the crucible do not come in contact with each other; supplying plasma gas from the top of the crucible to the surface of the melt to remove oxygen from the melt; and supplying calcium gas from the bottom of the crucible to the space between the inner wall of the crucible and the melt to remove oxygen from the melt.

Unreacted calcium gas of the calcium gas can come into contact with the plasma gas to produce calcium ions, and the produced calcium ions can remove oxygen from the melt.

The oxygen removal as described above can be explained as follows.

that the reaction between calcium and oxygen is spontaneous, because the $\Delta G$ of this reaction is lower than that of the reaction between titanium and oxygen.

Figure 4:
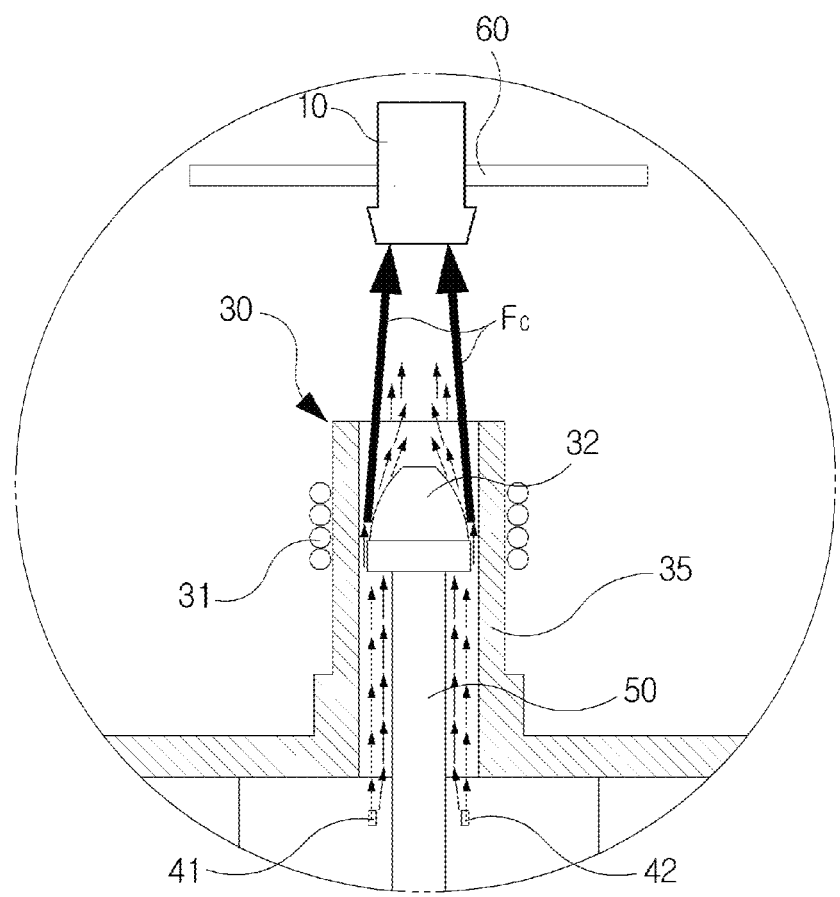
FIG. 4 shows a state in which a curtain wall flow is formed by injection of calcium gas into an apparatus for refining titanium scraps and sponge titanium according to an example of the present invention.
Figure 5:
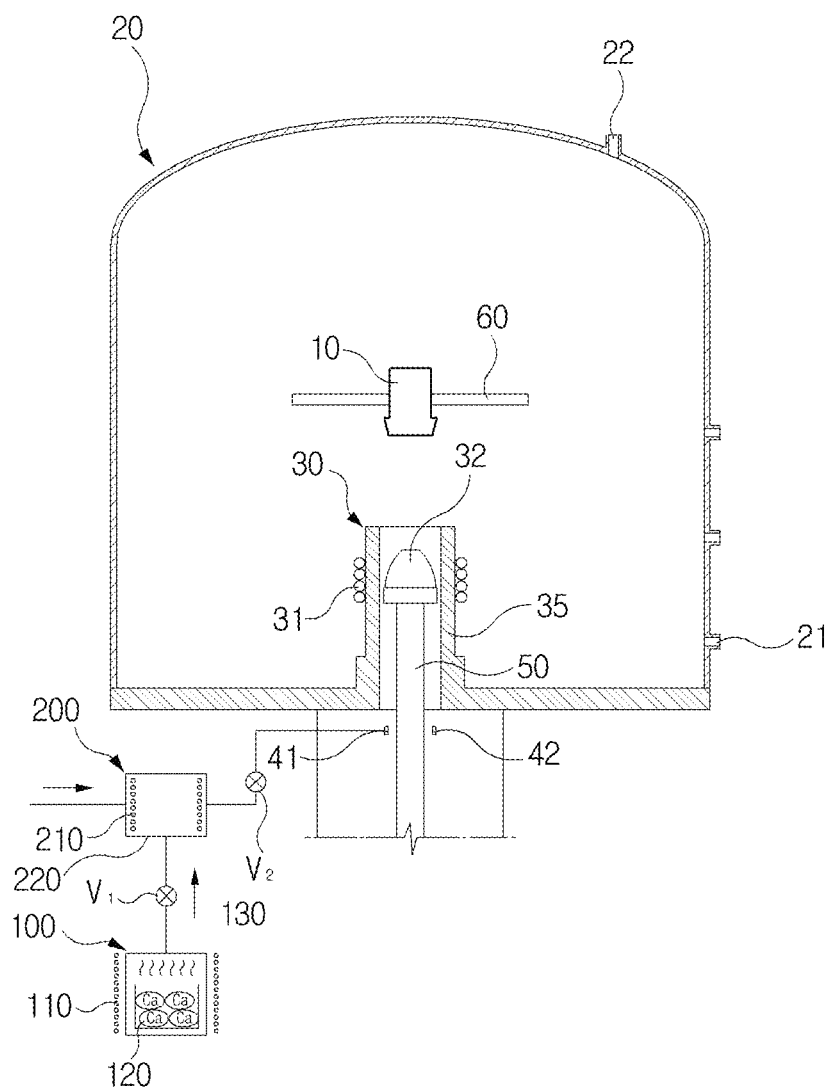
FIG. 5 illustrates elements required for the production of calcium gas in an apparatus for refining titanium scraps and sponge titanium according to an example of the present invention.

As shown in FIGS. 3 to 5, the apparatus according to the present invention may comprise a plasma torch 10, a vacuum chamber 20, a crucible 30, a collection plate 60, and a calcium gas supply means.

Among the above elements, the plasma torch 10 is located above the crucible 30, and functions to supply plasma gas. In the vacuum chamber 20, an inlet 21 for injecting inert gas (e.g., argon gas or helium gas) is formed at the side. Herein, one or more inlets 21 may be formed (in this embodiment, three inlets 21 are formed at the side of the vacuum chamber 20). Meanwhile, an outlet 22 is formed at the top of the vacuum chamber 20. The outlet 22 is configured to discharge gas from the vacuum chamber 20 in order to maintain the vacuum chamber 20 under a vacuum.

Meanwhile, the outside of the crucible 30 is provided with a coiled induction coil 31. Specifically, the crucible 30 is an electromagnetic crucible, and in this case, an alternating current is applied to change the magnetic field to thereby

TABLE 2

| Ti(g) + O(g) = TiO(g) | | Ti(g) + O2(g) = TiO2(g) | | Ca + 2(g) + O(g) + 2e − (g) = CaO | | 2Ca + 2(g) + O2(g) + 4e − (g) = 2CaO | |
|---|---|---|---|---|---|---|---|
| Temperature (° C.) | $\Delta G$(kcal) | Temperature (° C.) | $\Delta G$(kcal) | Temperature (° C.) | $\Delta G$(kcal) | Temperature (° C.) | $\Delta G$(kcal) |
| 0 | −152.7277 | 0 | −178.0306 | 0 | −650.75 | 0 | −1190.032 |
| 200 | −147.4496 | 200 | −171.9621 | 200 | −635.283 | 200 | −1164.826 |
| 400 | −141.9746 | 400 | −165.8035 | 400 | −619.502 | 400 | −1139.244 |
| 600 | −136.4084 | 600 | −159.6246 | 600 | −603.541 | 600 | −1113.441 |
| 800 | −130.7876 | 800 | −153.4398 | 800 | −587.452 | 800 | −1087.466 |
| 1000 | −125.1274 | 1000 | −147.2504 | 1000 | −571.263 | 1000 | −1061.351 |
| 1200 | −119.4342 | 1200 | −141.0543 | 1200 | −554.995 | 1200 | −1035.121 |
| 1400 | −113.7104 | 1400 | −134.8475 | 1400 | −538.664 | 1400 | −1008.801 |
| 1600 | −107.9562 | 1600 | −128.6254 | 1600 | −522.284 | 1600 | −982.409 |
| 1800 | −102.1709 | 1800 | −122.3834 | 1800 | −505.867 | 1800 | −955.964 |
| 2000 | −96.35358 | 2000 | −116.1171 | 2000 | 489.422 | 2000 | −929.48 |
| 2200 | −90.50308 | 2200 | −109.8224 | 2200 | 472.957 | 2200 | −902.969 |
| 2400 | −84.61842 | 2400 | −103.4958 | 2400 | −456.477 | 2400 | −876.439 |
| 2600 | −78.69888 | 2600 | −97.13418 | 2600 | 439.986 | 2600 | −849.898 |
| 2800 | −72.74407 | 2800 | −90.73501 | 2800 | 423.489 | 2800 | −823.349 |
| 3000 | −66.7539 | 3000 | −84.29626 | 3000 | 407.604 | 3000 | −798.031 |
| 3200 | −60.72852 | 3200 | −77.8163 | 3200 | −392.368 | 3200 | −774.017 |
| 3400 | −54.6682 | 3400 | −71.29389 | 3400 | −377.191 | 3400 | −750.125 |
| 3600 | −48.57333 | 3600 | −64.72811 | 3600 | −362.07 | 3600 | −726.345 |
| 3800 | −42.44436 | 3800 | −58.11835 | 3800 | −347.001 | 3800 | −702.673 |
| 4000 | −36.2818 | 4000 | −51.46424 | 4000 | −331.982 | 4000 | −679.102 |
| 4200 | −30.08619 | 4200 | 44.76564 | 4200 | −317.009 | 4200 | −655.627 |
| 4400 | −23.85807 | 4400 | −38.0226 | 4400 | −302.081 | 4400 | −632.242 |
| 4600 | −17.59798 | 4600 | −31.23539 | 4600 | −287.196 | 4600 | −608.944 |
| 4800 | −11.30651 | 4800 | −24.40449 | 4800 | −272.351 | 4800 | −585.728 |
| 5000 | −4.984267 | 5000 | −17.5306 | 5000 | −257.546 | 5000 | −562.591 |
| 5200 | 1.3681288 | 5200 | −10.61455 | 5200 | −242.777 | 5200 | −539.529 |
| 5400 | 7.750085 | 5400 | −3.657301 | 5400 | −228.043 | 5400 | −516.54 |
| 5600 | 14.161043 | 5600 | 3.3400688 | 5600 | −213.344 | 5600 | −493.619 |
| 5800 | 20.600485 | 5800 | 10.376399 | 5800 | −198.677 | 5800 | −470.766 |
| 6000 | 27.067945 | 6000 | 17.450449 | 6000 | −184.042 | 6000 | −447.977 |

Table 2 above shows the standard free energy values of reactions between titanium and oxygen atoms or oxygen molecules and between calcium and oxygen atoms or oxygen molecules as a function of temperature.

Figure 7A:
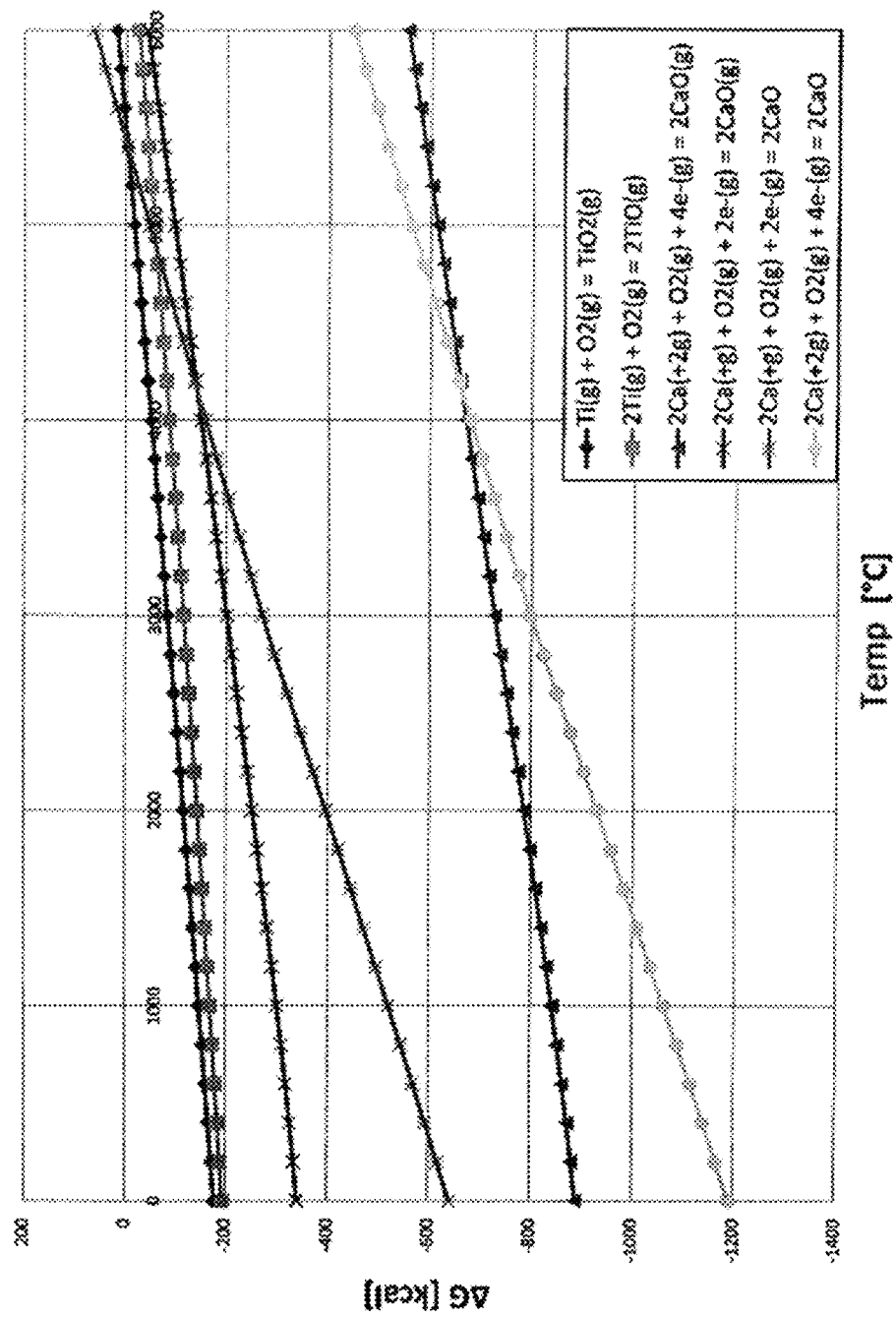
FIGS. 7a and 7b show the standard free energy values of reactions between titanium and oxygen atoms or oxygen molecules and between calcium and oxygen atoms or oxygen molecules as a function of temperature.
Figure 7B:
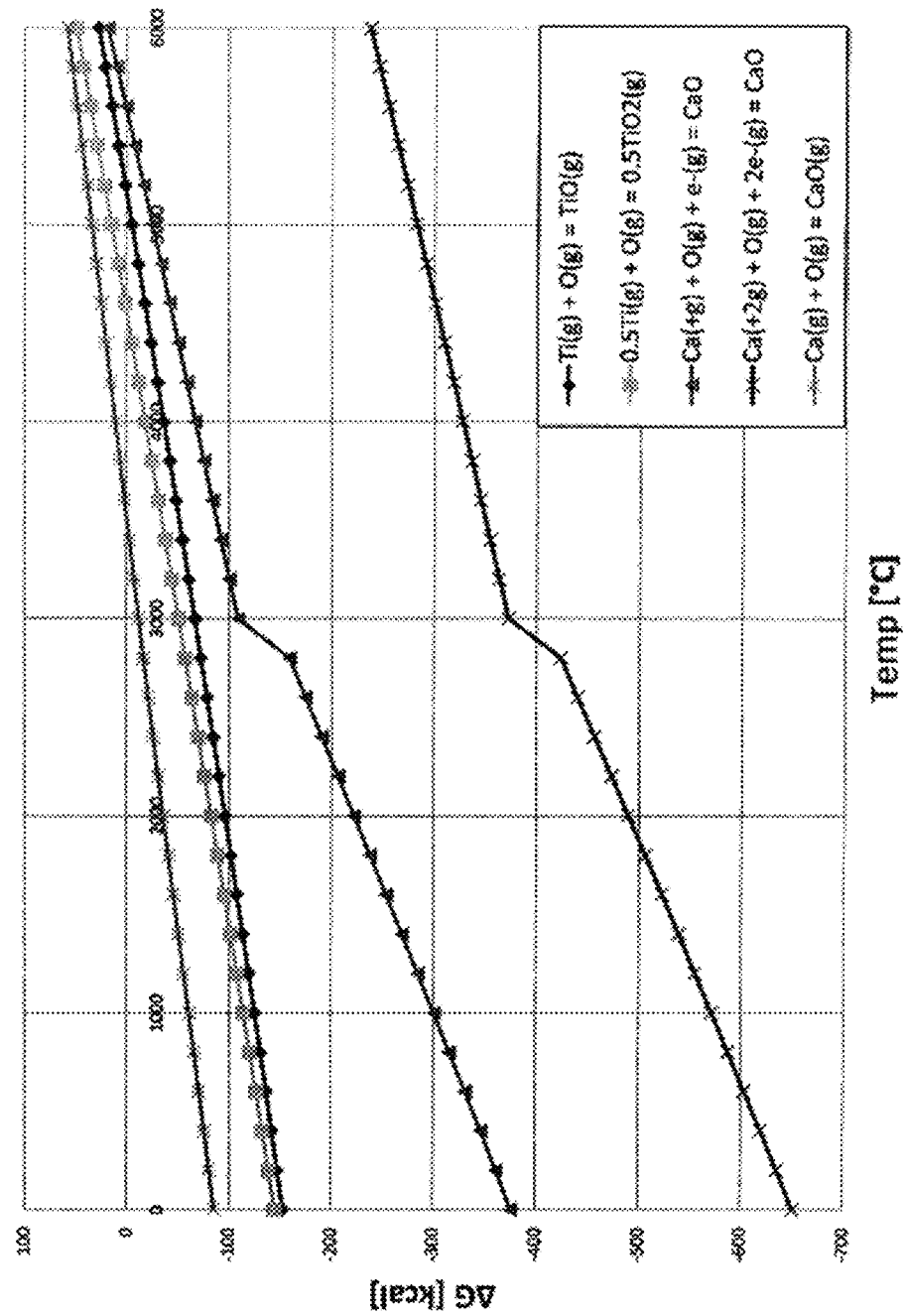

Referring to Table 2 above and FIGS. 7a and 7b, the change in Gibbs free energy between reactions can be seen. Specifically, it can be seen that, at 1600° C. corresponding to the melting point of titanium, $\Delta G$ is −107.96 kcal for the reaction "Ti(g)+O(g)=TiO(g)" and −128.63 kcal for the reaction "Ti(g)+O$_2$(g)=TiO$_2$(g)", but is −435.44 kcal for the reaction "Ca$^{+2}$(g)+O(g)+2e$^-$=CaO" and −808.72 kcal for the reaction "2Ca$^{+2}$(g)+O$_2$(g)+4e$^-$=2CaO". Thus, it can be seen form an induced current on the surface of the metal to be melted, and the metal is melted by Joule's heat generated from the induced current. This direct melting method using electromagnetic induction can melt a material such as a metal within a short time, and thus can provide high productivity.

In addition, the induced current interacts with the electromagnetic field to generate an electromagnetic force (Lorentz force) on the melt 32. The generated electromagnetic force is always directed to the center of the crucible 30 according to the Fleming's left hand law, even when the direction of the coil current changes. Further, the generated electromagnetic force can prevent the contact between the melt and the inner wall 35 of the crucible 30 due to a pinch effect such as electromagnetic pressure. For this reason, between the inner wall 35 of the crucible 30 and the melt 32, a space (or gap) is formed.

Meanwhile, the collection plate 60 is a means for condensing and collecting impurities contained in rising impurity gases, generated from the melt 32 in the crucible 30. Specifically, the collection plate 60 may comprise a cooling means for providing a temperature difference between the inside and outside of the vacuum chamber 20. Meanwhile, as shown in FIGS. 3 to 5, the collection plate 60 is located above the crucible 30 in a position vertically corresponding to the crucible 30. Thus, the collection plate 60 is exposed directly to impurity gases rising from the crucible 30.

The calcium gas supply means is located under the crucible 30. Specifically, the calcium gas supply means is configured to inject calcium gas around the melt 32, and comprises a plurality of injection units 41 and 42 capable of injecting calcium gas into the vacuum chamber 20 (specifically, the space between the melt and the inner wall of the crucible).

Meanwhile, as shown in FIG. 5, calcium gas can be produced in a calcium gas production unit 100. The calcium gas production unit 100 is configured such that solid-state calcium 120 is fed into the production unit 100 and vaporized by a heating coil 120 to produce calcium gas which is then injected at high pressure through the injection units 41 and 42.

Herein, the injection units 41 and 42 are composed of a plurality of nozzles disposed to surround around the melt 32. Thus, these units can be configured such that they can form a curtain wall flow (Fc) between the bottom side of the collection plate 60 and the melt 32, as shown in FIG. 32.

In addition, through the injection units 41 and 42, not only calcium gas, but also a mixture of calcium gas with inert gas (e.g., argon gas), may be injected. For the latter case, a mixing chamber 200 may be provided between the injection units 41 and 42 and the calcium gas production unit 100. In this case, a heating coil 210 is preferably provided in the mixing chamber 200 in order to prevent calcium gas from being condensed due to a decrease in its temperature during mixing of high-temperature calcium gas with low-temperature inert gas supplied from the outside.

Thus, it is preferred that calcium gas 100 be maintained in an activated state by preventing the calcium gas 100 from being condensed due to a decrease in its temperature during mixing of the calcium gas 100 with inert gas supplied from the outside.

In addition, the calcium gas production unit 100, the mixing chamber 200 and the injection units may be configured to communicate with one another by supply lines, and valves $V_1$ and $V_2$ may be provided in these supply lines such that they can be opened and closed.

In the apparatus for refining titanium scraps and sponge titanium according to the present invention, configured as described above, a gas mixture (mixture of inert gas and calcium gas) is injected through the injection units 41 and 42 provided under the crucible 30, and is then injected into the gap between the ingot 50 and the inner wall 35. Then, the injected gas passes through the space between the melt 32 and the inner wall 35 and is transferred to the bottom side of the collection plate 60. Thus, as shown in FIG. 3, the gas injected vertically from the injection units 41 and 42 forms a curtain wall flow ($F_c$) between the top of the crucible 30 and the collection plate 60. In other words, the gas flow that moves up along the outside of the melt 32 forms a curtain wall flow (Fc) corresponding to the outside of the melt 32.

The curtain wall flow (Fc) formed as described above acts to remove oxygen generated during melting in the crucible 30, and also acts to prevent impurity gas generated during melting from being diffused into the vacuum chamber 20.

In addition, the curtain wall flow (Fc) functions to induce impurity gases, which rise from the crucible 30, to be concentrated on the bottom of the collection plate 60. Specifically, the gas mixture injected from the bottom of the crucible 30 is injected directly to the bottom side of the collection plate 60 through the gap between the melt and the crucible to form the curtain wall flow (Fc). The formed curtain wall flow (Fc) functions to guide impurity gases, which are generated during metal melting and rise from the crucible 30, to the collection plate 60 while maintaining the impurity gas in the curtain wall flow (Fc) so as to prevent the impurity gas from being diffused into the vacuum chamber 20, and it also functions to remove oxygen from the melt 32.

Example

Cut scraps, made of a Ti-6Al-4V alloy and generated during lathe machining, were crushed to a suitable size and pickled. The pickled scraps were washed with alcohol and distilled water and dried, thereby preparing a charge material for melting and refining.

A bottomless circular cold crucible 30, made of copper and having an inner diameter of 50 mm, was placed in a main chamber for melting and refining. A graphite stack was placed in the circular cold crucible 30, and a rod-shaped Ti-6Al-4V alloy for use as a seed was placed thereon. In addition, the cold crucible was surrounded by an electromagnetic induction coil 31 to which a power of up to 100 kW would be supplied. When a current flowed through the induction coil 31, the material charged in the cold crucible 30 was melted, and after completion of initial melting of the material, an additional scrap material was continuously charged into the crucible from a material supply unit provided above the crucible. The system was configured such that a solidified ingot could be withdrawn downward in a vertical direction by an ingot withdrawing device.

Prior to this melting/refining experiment, a vacuum was formed in the chamber, and the inside of the chamber was purged with argon. This vacuum formation and purge process is a process not only for preventing titanium having a high affinity for oxygen from reacting with atmospheric moisture, but also for preventing titanium from being contaminated with external impurities, and was repeated three times in this Example.

The induction melting process was started with a power of 10 kW, and the power was increased at a rate of 10 kW/min. At a power of about 35 kW, the rod charged in the cold crucible was melted. After about 1 minute from the time point at which the rod was completely melted, continuous scrap material charging was performed according to the determined optimum material supply rate and ingot withdrawing rate.

After the flow of the melt 32 obtained by complete melting of the material was somewhat stabilized, the distance between the lower end of the plasma and the melt was maintained to about 1-10 cm by controlling the power value of the induction coil. Next, a plasma non-transfer mode was performed in a state in which the (−) electrode was connected to the lower tip of the plasma torch and the (+) electrode was connected to the lower end of the withdrawing chamber. After the normal operation in the non-transfer mode was confirmed, the plasma refining process was performed in a transfer mode in which the (+) electrode changed from the lower end of the withdrawing chamber to the melt portion. The plasma refining process was performed at a voltage of 200-350 V and a current of 20-60 A.

In addition, among gases from the plasma, argon gas as pilot gas was supplied at a flow rate of 1-5 liter/min, and a mixture of argon gas and hydrogen gas as shield gas was supplied at a flow rate of 5-25 liter/min. Herein, argon and hydrogen was maintained at a volume ratio ranging from 1:0.03 to 1:0.5 during the refining process.

Under such conditions, the refining process was performed for 30 minutes. The Ti-6Al-4V alloy rod obtained in this experiment had a length of about 45 cm, and the amount of scraps used to produce the alloy rod was 4 kg.

Tables 3 and 4 below show the results of analyzing the metal components and oxygen and hydrogen gases before and after melting and refining of the Ti-6Al-4V scraps used in this Example.

TABLE 3

| Metal components | Before refining (scraps) | After refining (ingot) |
|---|---|---|
| Ba | 0.00% | 0.00% |
| Cd | 0.00% | 0.00% |
| Co | 0.13% | 0.13% |
| Cr | 0.02% | 0.03% |
| Cu | 0.03% | 0.04% |
| Mn | 0.00% | 0.00% |
| Ni | 0.02% | 0.03% |
| Pb | 0.09% | 0.10% |
| V | 3.73% | 3.59% |
| Zn | 0.00% | 0.00% |
| Fe | 0.20% | 0.21% |
| Al | 6.93% | 6.83% |
| Si | 0.10% | 0.06% |

TABLE 4

| Components | Before refining (scraps) | After refining (ingot) |
|---|---|---|
| H | 0.0251% | 0.0240-0.0290% |
| O | 0.5356% | 0.3130-0.4125% |

From the results in Tables 3 and 4 above, it can be seen that the contents of the metal components and hydrogen did not substantially change and the content of oxygen was reduced by 23-42% after refining.

While the present invention has been described with reference to the particular illustrative embodiments, it will be understood by those skilled in the art to which the present invention pertains that the present invention may be embodied in different forms without departing from the essential characteristics of the present invention. Therefore, the disclosed embodiments are should be considered illustrative in all respects, rather than restrictive. Furthermore, it should be understood that the scope of the present invention is defined by the appended claims rather than the detailed description and includes all modifications within the range equivalent to the claims.

The invention claimed is:

1. A method for refining titanium scraps and sponge titanium, comprising a step of removing oxygen from a titanium melt by supplying plasma gas from a top of a crucible to a surface of the melt,
wherein an atmospheric oxygen molecule is adsorbed to the surface of the melt to form a titanium oxide layer, and the step of removing oxygen comprises the steps of:
diffusing the plasma gas to the surface of the melt;
allowing hydrogen ions and electrons, released from the plasma gas, to react with oxygen atoms of the melt on the titanium oxide layer; and
allowing an excess of hydrogen atoms, released from the plasma gas, to combine into a hydrogen molecule which is consumed.

2. The method of claim 1, wherein the plasma gas comprises argon and hydrogen.

3. The method of claim 2, wherein the argon and the hydrogen are supplied at a volume ratio ranging from 1:0.03 to 1:0.5.

4. A method for refining titanium scraps and sponge titanium, comprising the steps of:
performing melting in a crucible by a magnetic field of an induction coil in a state in which a melt and an inner wall of the crucible do not come in contact with each other; and
supplying calcium gas from a bottom of the crucible to from a space between the inner wall of the crucible and the melt to remove oxygen from the melt.

5. The method of claim 4, wherein the calcium gas forms a curtain wall flow surrounding the melt.

6. A method for refining titanium scraps and sponge titanium, comprising the steps of:
performing melting in a crucible by a magnetic field of an induction coil in a state in which a melt and an inner wall of the crucible do not come in contact with each other;
supplying plasma gas from a top of the crucible to a surface of the melt to remove oxygen from the melt; and
supplying calcium gas from a bottom of the crucible to a space between the inner wall of the crucible and the melt to remove oxygen from the melt.

7. The method of claim 6, further comprising the steps of:
bringing unreacted calcium gas of the calcium gas into contact with plasma to produce calcium ions;
removing oxygen from the melt by the produced calcium ions.

8. An apparatus for refining titanium scraps and sponge titanium, the apparatus comprising:
a vacuum chamber;
a crucible located in the vacuum chamber and configured to perform melting by a magnetic field of an induction coil in a state in which a melt and the inner wall of the crucible do not come in contact with each other;
a calcium gas supply means configured to supply calcium gas from a bottom of the crucible to a space between the inner wall of the crucible and the melt.

9. The apparatus of claim 8, further comprising a collection plate located above the crucible and configured to collect impurity gases which are generated during melting.

10. The apparatus of claim 9, wherein the calcium gas supply means is configured such that the calcium gas is injected around the melt to form a curtain wall flow surrounding the melt.

11. The apparatus of claim 8, wherein the calcium gas supply means comprises:
a calcium gas production unit configured to vaporize solid-state calcium by heat to produce calcium gas; and
a plurality of injection units configured to inject the calcium gas, supplied from the calcium gas production unit, from the bottom of the crucible to the top of the crucible.

12. The apparatus of claim 11, further comprising a mixing chamber connected to the calcium gas production unit and configured to mix an inert gas, supplied from the outside, with the calcium gas supplied from the calcium gas production unit, and to supply the mixed gases to the injection units.

13. The apparatus of claim 12, wherein the mixing chamber comprises a heating means configured to heat the inert gas.

\* \* \* \* \*